United States Patent Office 3,573,976
Patented Apr. 6, 1971

3,573,976
METHOD OF MAKING COAXIAL CABLE
Jerome J. Duane, Lincoln, Mass., assignor to
United-Carr Incorporated, Boston, Mass.
No Drawing. Filed Nov. 17, 1967, Ser. No. 683,804
Int. Cl. B44d 1/18
U.S. Cl. 117—217　　　　　　　　　　　　　　2 Claims

ABSTRACT OF THE DISCLOSURE

This invention is directed at a coaxial cable, and particularly, at a coaxial cable using a syntactic foam containing glass, silica or ceramic microspheres as the dielectric medium between the central and outer conductors.

BACKGROUND OF THE INVENTION

For ultra high-frequency transmission under the most stringent conditions, where power losses in the cable must be minimized, it is usually preferable to select a cable with an air dielectric rather than a solid dielectric. Dry air has a dielectric constant approaching unity and a power loss factor of essentially zero, whereas all solid dielectrics have a dielectric constant of two or greater and a finite measurable loss factor and it is vital to have these two parameters at a minimum. This highly desirable air structure may be fabricated by using discretely aligned spacers formed of a low-loss dielectric which maintain an annular gap between the central conductor and the outer conductor in a coaxial cable in such a way that the dielectric spacers occupy the least possible portion of the total enclosed volume. While this is electrically excellent, the construction is quite expensive, is mechanically inflexible, and requires periodic flushing with dry air or nitrogen to maintain the low-loss quality inherent in the air dielectric. Advantages have been gained by substituting a foamed dielectric for the discretely placed spacers, thereby maintaining the large volume of air in the dielectric space while making the fabrication simpler and less expensive.

While foamed dielectric cable has utility and is available commercially, there are several difficulties which prevent its full utilization as the preferred coaxial cable for ultra high frequency transmissions. The most serious problem is that of moisture penetration through the very thin walls of the foamed plastic, for example polyethylene, so that exposure of the cable to a humid environment permits diffusion of moisture into the closed but permeable air cells, causing electrical power loss and vitiates the beneficial effects of the foamed structure. This water diffusion problem can be solved to a great extent by the use of a heavy multi-layer insulating outer jacket which in turn creates its own problems. Another difficulty is the decreased flexibility associated with the foamed structure compared to a solid plastic dielectric. The thin foamed walls between the air pockets tend to break easily on flexure of the cable, rendering the cable useless. A heavy outer jacket would also, of course, reduce the required flexibility.

Many attempts have been made to construct a useful foamed dielectric coaxial cable without the aforementioned deficiencies. These attempts have been directed at the use of a solid, integral, ductile metal tubular outer conductor which effectively seals off the foamed dielectric from hostile environments. These attempts suffer from one or another of the problems which arise as a result of using a solid tubular outer conductor such as high cost of fabrication, high weight per unit length, and lack of flexibility. At elevated temperatures the plastic tends to extrude from the ends of the solid tube, due to its greater volume expansion than the metal tube. One of these attempts for increasing the strength and flexibility and lessening the problems which arise because of the differential thermal expansion of the dielectric and the conductor is the use of a helically grooved outer conductor, disclosed in Brandes and Andresen, U.S. Pat. No. 2,890,263. Brandes et al. suggests the use of a foamed dielectric encased in a bimetallic tube which is formed by bending a metallic sheet around the central conductor and its encasing dielectric, and then joining the mating edges by a continuous weld, making sure to reduce the metal thickness at the weld portion so that the welded seam is of the same thickness as the remainder of the outer conductor, then forming a continuous helical groove or bellows type corrugation in the outer conductor to increase the crushing strength and flexibility of the assembly, compared to a like-dimensioned cylindrical metal tube. Another disclosure, Lamons, U.S. Pat. No. 3,173,990, utilizes a similarly foamed and helically grooved dielectric, as disclosed in Brandes et al., but compresses the foam under the trough of the groove to provide improved flexibility.

In both the cited patents the method of fabrication is cumbersome, requiring heavy-duty metal bending, forming, welding, and grooving machinery, and, in fact, is suitable only for fabricating cable of very heavy gauge. The cable exemplified in the aforesaid Lamons disclosure ranges from one-half to one inch in outer diameter, a size completely unsuitable for airborne electronic equipment. At latest reports, cable of 50 ohms impedance, available commercially, fabricated by this method of construction is obtainable in a minimum size of one-quarter inch diameter. This size cable weighs 6 pounds per 100 feet, unjacketed, and may be bent around a radius of 2.5 inches.

A particularly desirable method of fabricating flexible, hermetically-sealed and light-weight coaxial cable, of the same desirable 50 ohms characteristic impedance, is taught by Wright, in U.S. Pat. No. 3,287,490. Wright uses a solid cylindrical dielectric on the center conductor, helically grooves the plastic, then deposits successively electroless and electrolytic copper to form the outer conductor, conformal to the grooves in the cable. The outer conductor can be very thin, about 1 mil, in contrast to the 10 mils specified by Lamons.

Utilizing the Wright disclosure, a 50 ohms cable with a solid polyethylene dielectric, is less than one-eighth inch in diameter and weighs 0.72 pound per 100 feet, about one-eightieth of the Lamons' construction, and may be bent about a minimum of radius of one-eighth inch, equal to the diameter of the cable.

A very desirable goal is to provide a combination of grooved, foamed dielectric and conformal plated outer conductor to provide the ultimate in lightness of weight, flexibility, and low electrical losses. This material would be extremely attractive and useful to the aerospace industry in which light weight, compactness, flexibility and hermetic sealing against hostile environments coupled with a low-loss electrical behavior at ultra high radio frequencies is the sine qua non of airborne component and interconnection fabrication. The inventor has experimented with foamed polyethylene dielectric, following the teachings of Wright, and has found that the foamed dielectric material presently available commercially is not suitable for plating after grooving because the outer cells are ruptured by the grooving operation. By forming a syntactic foam dielectric coating on a conducting wire in a manner described herein, the dielectric may not only be grooved and plated in an entirely satisfactory manner, but the weight of the finished cable has been improved to a remarkable degree and the thermal expansion coefficient of the dielectric has been made almost equal to that of the metallic conductors, so that cracking and failure of the finished cable under thermal cycling is virtually eliminated.

SUMMARY OF THE INVENTION

It is therefore an object of the present invention to provide an improved coaxial cable construction which is distinguished by extreme lightness of weight, flexibility, resistance to ambient humidity and a long temperature range of operation.

Another object of this invention is to provide a coaxial cable which has extremely low power losses at ultra high ratio frequencies under environmental extremes.

It is a still further object of this invention to provide a coaxial cable of small diameter using a syntactic foam dielectric comprising a dispersion of hollow microspheres of glass, silica, or ceramic composition in a thermoplastic composition of low dielectric constant and low power loss factor.

It is still another object of the present invention to provide a syntactic foam composition which may be extruded at nominal pressures and temperatures which has a high green strength and which sinters upon subsequent heating to a form a cable coating composition having a high degree of flexibility, a long useful temperature range and better electrical properties at high frequencies than is now available.

It is a further object of the present invention to provide a syntactic foam cable coating on a central conducting wire which can be subsequently helically grooved so that the resulting surface remains smooth and unbroken without air pockets or voids, and which can be plated with a conducting metal.

DESCRIPTION OF PREFERRED EMBODIMENTS

The syntactic foam composition which is referred to may be defined as a thermoplastic matrix enclosing a large number of discrete hollow, spherical particles. These hollow spheres are sometimes referred to as Microballoons and are available commercially, fabricated of synthetic plastics, glass, silica, ceramic or metal. Normally, these Microballoons might be used to infiltrate plastics of the rigid, thermosetting type, such as epoxy or polyester resins, to afford a substantially rigid structure of very low density seemingly incommensurate with its great ability to resist crushing Unfortunately, this class of insulation cannot be used to coat a conducting wire, to form a cable of anywhere near the required degree of flexibility. We find that this flexibility can be achieved by mixing Microballoons in a thermoplastic resin with added polymeric plasticizers or tackifying agents.

A limiting factor in obtaining high loadings of these microscopically small hollow spheres within resin systems is their ready friability, particularly the thin-walled glass or silica variety. While this is relatively minor problem in preparing liqud pour-in-place casting resins such as epoxies, polyesters or silicones, the shearing and compressive forces necessary to melt and extrude thermoplastic dielectric compositions onto a continuously moving wire in forming insulated cable are considerably higher. If the pressure is great enough in the extruder, the friable bubbles will be crushed. The inventor has discovered how to perform this extruding operation so that polyethylene can contain up to about 80 percent by volume of glass or silica microspheres and yet be extruded continuously and rapidly on cable forming machinery. The resulting cable is of low cost and, therefore, commercially attractive.

Example 1

In order to illustrate the workings of this invention, the inventor has made a coatable syntactic foam composition that can be plated with copper.

To a beaker containing 115 cc. of ethylene dichloride, 64 g. of a microfine powdered, polyethylene (sold under the trade name of Microthene FN 500) was added, with stirring. This is a unique form of low density polyethylene (0.915 g./cc.) marked by its small particle size (8 to 30 micrometers) and spherical shape. To this were added 18.2 g. of hollow microspheres of silica, sold as Eccospheres SI. This material has a bulk density of only 0.18 g./cc. and a true particle density of 0.26 g./cc. The particle size range is from 30 to 125 micrometers and the wall thickness averages about 2 micrometers. The corresponding volume ratio of microspheres to polyethylene is 1:1. Into this well-stirred mixture was dipped a small glass test tube having a copper coating on the outside. This was withdrawn at a moderate and constant rate. The liquid carrier, in this case ethylene dichloride, evaporated rapidly at room temperature, leaving a dried white coating of nearly uniform 150 micrometers thickness. The dried coating was next heated to 150° C. in an air oven. After three minutes the polyethylene had sintered to form a continuous and impermeable translucent coating having an unbroken surface.

The polyethylene, of a high linear coefficient of thermal expansion, is now loaded with silica bubbles, of a very low coefficient of thermal expansion. The composite structure has, therefore, some intermediate value of linear coefficient of thermal expansion lying between the two extremes. It is demonstrable that, in fact, the 50 percent by volume of hollow silica microspheres in the coating of this example reduces the coefficient of thermal expansion of the pure polyethylene from a value of $16 \times 10^{-5}$ inch/ inch/° C. to $8 \times 10^{-5}$ inch/inch/° C. in the composite syntactic foam. Metallic copper has an expansion coefficient of $1.8 \times 10^{-5}$. Having thus halved the differential between the copper and the dielectric core, we have reduced the tendency of the core stock to either extrude out the ends of the cable or to burst the externally plated copper upon heating. In effect, the usable temperature range of the cable has been extended.

This composition was plated with copper to form a continuous metal layer by any of the known procedures involving deposition of electroless copper on plastic surfaces. No electrical shorts could be detected between the inner and outer coating, proving that the syntactic foam was continuous and pore-free.

The liquid slurry just described is satisfactory for coating a static article with a mixture of thermoplastic resin and microspheres, but is not practical for coating cable continuously, due to the fact that the dried composition lacks the necessary property of "green strength," that is to say the dried composition has little cohesive strength before sintering and will brush-off or be otherwise removed from the wire under small stresses such as vibration, rubbing, or even strong air currents. For this reason it is necessary to incorporate a tackifying or bonding agent to the mixture so that the dried, unsintered coating will hold together until fused by heat. This is best accomplished by adding a small amount of a compatible liquid which is non-volatile at extrusion temperatures. Because of the necessary quality of low dielectric constant which is required in this coaxial cable, the bonding liquids are limited to non-polar materials which have a low dielectric constant and particularly a low power loss factor. Such a liquid is mineral oil, or white oil, a liquid aliphatic hydrocarbon. Powdered polyethylene can be blended with up to an equal weight of heavy mineral oil (Nujol), which can be dissolved in the polyethylene when the mixture is heated above its melting point. Unfortunately, mineral oil is not completely soluble in polyethylene at room temperature, so that the solidified mixture eventually exudes some oil to the surface on standing. This is a completely unsatisfactory surface for plating metal as no adhesion will take place with the oily surface layer.

A much better bonding agent is a liquid hydrocarbon synthetic polymer, exemplified by a polyisobutylene of low degree of polymerization, sold under the trade name of Vistanex, LM. This is completely compatible with polyethylene and has excellent dielectric properties. Because it is a very high viscosity liquid, it is extremely tacky and serves to bind the dry powdered polyethylene and microspheres together until the sintering can be completed.

A mixture suitable for extrusion is disclosed in Example 2.

Example 2

The following formulation was made up:

5.2 g. Eccospheres SI
9.0 g. Microthene FN 500
12.0 g. 33% Vistanex in trichloroethylene All the liquid and Microthene were stirred together, to a stiff paste, then the silica microspheres were added slowly together with dropwise additions of trichloroethylene to maintain the viscosity high. After continued stirring for some 20 minutes, the composition had a doughy consistency when rolled between the fingers. The paste, which has about 60% by volume of Microballoons, was charged into a hypodermic syringe and extruded at room temperature merely by finger pressure. The wet strand extruded had a high green strength, meaning that it would remain a continuous thread while being handled and placed into an oven at 140° C. A similar mixture without the Vistanex could be extruded easily, but crumpled into small fragments as the trichloroethylene evaporated. This composition has no green strength without the binding agent.

The formulation in Example 2 can be extruded by modified cable forming machinery, e.g., an extruder having a crosshead die for feeding the central wire continuously while the doughy syntactic composition is being extruded onto it continuously. Because the syntactic composition is a liquid, no heat is required to melt it, nor is any great pressure necessary to move it onto the wire, therefore heating units can be eliminated and the tapered extruder screw feeding the material could be replaced with a simple helical feed screw so that pressure buildup is kept below 1000 p.s.i., preferably 200–500 p.s.i. at the head. The equipment would be in the category of continuous cold-molding machinery.

The coated wire passes from the extruder head continuously through a warm air zone to remove the volatile carrier, such as ethylene dichloride or trichloroethylene, then passes through a heat sintering zone. The temperature of the air in the sintering furnace should be regulated to the length of time in transit through the heated zone. That is to say, the shorter the time, the higher the temperature. We find that 3 to 4 minutes at 130° C. is a minimum condition for complete sintering. If the cable moves through the oven faster than this, then the temperature must be raised to permit complete sintering during the shorter time of passage.

The cable, insulated with the syntactic foam composition, can be plated with copper to form a coaxial cable, or can be grooved with a helical or bellows configuration prior to plating to make a coaxial cable of improved flexibility. Grooving can be performed with a rotating heated die, whereby the surface of the heated thermoplastic is displaced to the desired configuration, and sets immediately thereafter, the plastic having been melted superficially and the hollow microspheres imbedded therein moving along with the molten plastic without rupturing. The surface of the grooved cable remains microscopically smooth, without voids, if the microspheres remain intact.

Plating on the smooth surface commences with cleaning the surface with an agent to render it hydrophilic, such as chromic acid, then rinsing thoroughly prior to sensitizing with stannous chloride solution. After sensitization, the cable is treated with a salt of a noble metal, which is reduced by the adsorbed sensitizer to form microscopically small localized sites of adsorbed noble metal on the cable surface. Palladium from dilute palladous chloride solution is eminently satisfactory for this purpose. A micro layer of electrically conducting silver or copper is then deposited using commercially available "electroless" plating baths, made specifically for this purpose. The final step is to deposit a 1 mil thick layer of copper on the prepared cable, in an electrolytic copper plating bath by standard means to form the outer conductor and complete the structure of this invention.

Example 3

In order to reduce even further the coefficient of thermal expansion of the dielectric core to a value approaching equality to that of the outer copper conductor, it is necessary to load the syntactic foam with a very high volume of silica microballoons greater even than the theoretical maximum packing density of spheres, which is about 67 percent volume of monodisperse spheres. At greater loadings than this, say about 80 percent microballoons and 20 percent polyethylene, there are voids left between the spheres, yet the spheres are well bonded at their points of closest approach to each other by the small amount of polyethylene present. While this structure can be extruded and sintered as before, the porosity created by the void spaces makes this unusable for subsequent copper plating; the copper will strike through to the lower surface of the coating. This has been corrected by putting a second coating of plain polyethylene over the first coating, or with a lower loading of microballoons, effectively sealing off the surface, as described in Example 4.

Example 4

A 75% volume loading of silica microballoons in polyethylene is achieved by mixing the two in a volume ratio of 3:1, with part of the polyethylene replaced by polyisobutylene to serve as binding agent during the presintering operations.

| | Vol., parts | Wt., parts |
| --- | --- | --- |
| Ethylene dichloride | 40 | 50 |
| Polyethylene powder | 12 | 11 |
| Polyisobutylene | 3 | 2.7 |
| Hollow silica microspheres | 45 | 11.7 |

The components were mixed together by slow speed stirring to a somewhat stiff consistency. Then a small amount of additional ethylene dichloride was added to reduce the viscosity to a coatable consistency and the mixture coated on a copper tube to give a dried thickness of about 20 mils. After the ethylene dichloride was removed under a current of warm air, the coating was sintered at 140° C. for ten minutes. Examination under the microscope showed the surface to be extremely rough, with large and deep pores open between the microspheres.

A second coating composition was prepared as above, but with a polymer-silica volume ratio of 2:1, i.e., only 33% of microspheres.

This composition was overcoated on the first, by dipping, to add another 4 mils of coated thickness. After drying and sintering, the surface was found to be smooth and unbroken, all the voids originally present now are filled with the second composition, and the surface can be plated upon without shorting through.

The same principle of compounding polyethylene and hollow microspheres with a liquid polymeric hydrocarbon to gain green strength of the extrudate can be applied to the extrusion of polymeric fluorocarbons, such as poly(tetrafluoroethylene), using a compatible liquid polymeric fluorocarbon which can be sintered in combination with the high polymer without adversely affecting its electrical or mechanical properties. Such a composition is useful for making coaxial cable suitable for high temperature operation.

Example 5

A 50% volume loading of hollow silica microspheres in poly (tetrafluoroethylene) is prepared in an inert volatile liquid carrier, such as ethylene dichloride, by stirring in the microspheres and powdered Teflon. To this is added a liquid copolymer of hexafluoropropylene and vinylidene fluoride, sold under the trade name of Viton LM by E. I. duPont De Nemours & Co., Inc. This is a high viscosity liquid of molecular weight about 3600. The extent of the liquid polymer addition should be between 5% and 25% of the weight of the powdered Teflon, about 15% giving the requisite amount of green strength for slow speed extrusion at low pressure. After drying free of the volatile ethylene dichloride, the extrudate passes through an oven that permits sintering of the fluorocarbons at temperatures at or above 330° C.

The resulting structure is a light-weight, flexible, and thermally stable cable coating, with an impermeable unbroken surface of polymeric fluorocarbon which can be plated with copper to form a coaxial cable after rendering the surface adhesionable and conductive by treatment with metallic sodium, preferably dispersed in liquid ammonia.

With reference to the foregoing description, it is to be understood that what has been disclosed herein represents only a few embodiments of the invention and is to be construed as illustrative rather than restrictive in nature and that the invention is best described by the following claims.

I claim:

1. The method of forming a coaxial cable comprising adding hollow microspheres formed of material selected from the group consisting of glass, silica, and ceramic to a suspension of powdered resin of a material selected from the group consisting of polyethylene and polymeric fluorocarbons, a volatile carrier of a material selected from the group consisting of ethylenedichloride and trichloroethylene and a tackifying agent of a material selected from the group consisting of polyisobutylene and a copolymer of hexafluoropropylene and vinylidene fluoride providing a formulation, extruding the formulation onto a copper inner conductor to provide a coating thereon, drying the assembly, and then plating a copper outer conductor onto the external surface of the coating.

2. A method of forming a coaxial cable as set forth in claim 1 wherein the formulation contains at least 20% by volume of microspheres.

References Cited

UNITED STATES PATENTS

| | | | |
|---|---|---|---|
| 3,046,172 | 7/1962 | Reid | 161—Microballoon Digest |
| 3,203,849 | 8/1965 | Katz et al. | Microballon Digest |
| 3,287,490 | 11/1966 | Wright | 174—28 |
| 3,316,139 | 4/1967 | Alford et al. | 161—Microballoon Digest |
| 3,278,673 | 10/1966 | Gore | 156—51X |

OTHER REFERENCES

H. E. Alford and F. Veatch, Glass Microballoon Particles, a Low Density Filler in Modern Plastics, November 1961, pp. 141, 142, 145, 146, 150 and 223.

ALFRED L. LEAVITT, Primary Examiner

C. K. WEIFFENBACH, Assistant Examiner

U.S. Cl. X.R.

117—218, 227, 232